(12) United States Patent
Mortensen et al.

(10) Patent No.: US 10,207,204 B2
(45) Date of Patent: Feb. 19, 2019

(54) LIQUID PROCESSING MIXER FOR MIXING A LIQUID WITH AN ADDITIVE

(71) Applicant: TETRA LAVAL HOLDINGS & FINANCE S.A., Pully (CH)

(72) Inventors: Hans Henrik Mortensen, Noerresundby (DK); Thomas Permin, Aalborg SO (DK); Frederik Larsen, Dronninglund (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 533 days.

(21) Appl. No.: 14/770,750

(22) PCT Filed: Feb. 17, 2014

(86) PCT No.: PCT/EP2014/053029
§ 371 (c)(1),
(2) Date: Aug. 26, 2015

(87) PCT Pub. No.: WO2014/131644
PCT Pub. Date: Sep. 4, 2014

(65) Prior Publication Data
US 2016/0008743 A1     Jan. 14, 2016

(30) Foreign Application Priority Data
Mar. 1, 2013 (SE) ...................... 1350249

(51) Int. Cl.
*B01D 19/00* (2006.01)
*B01F 5/10* (2006.01)
(Continued)

(52) U.S. Cl.
CPC ........ *B01D 19/0063* (2013.01); *B01F 5/0661* (2013.01); *B01F 5/104* (2013.01);
(Continued)

(58) Field of Classification Search
CPC ........ B01F 5/104; B01F 5/106; B01F 7/0075; B01F 5/0661; B01F 15/0243; B01F 15/0258; B01D 19/0063
(Continued)

(56) References Cited

U.S. PATENT DOCUMENTS 3,897,935 A  *  8/1975  Forster .................. B01F 5/0405
                                                      366/339
6,305,833 B1 *  10/2001  Horn ...................... B01D 9/005
                                                      366/136
(Continued)

FOREIGN PATENT DOCUMENTS

| DE | 179 40 319 A1 | 6/1998 |
| EP | 1 712 271 A2 | 10/2006 |
| WO | WO 2009/089837 A1 | 7/2009 |
| WO | WO 2012/017569 A1 | 2/2012 |
| WO | WO 2012/029663 A1 | 3/2012 |

OTHER PUBLICATIONS

International Search Report (PCT/ISA/210) dated May 27, 2014, by the European Patent Office as the International Searching Authority for International Application No. PCT/EP2014/053029. (4 pages).

*Primary Examiner* — Marc C Howell
(74) *Attorney, Agent, or Firm* — Buchanan Ingersoll & Rooney PC

(57) ABSTRACT

A liquid processing mixer is provided, comprising a mixing unit and a de-aeration vessel, the mixing unit being separated from the de-aeration vessel and in fluid connection with the de-aeration vessel, and wherein the liquid processing mixer further comprises at least one additive inlet arranged between the de-aeration vessel and a high shear mixing device of the mixing unit for introducing the additive downstream of the de-aeration vessel.

15 Claims, 3 Drawing Sheets

(51) Int. Cl.
  *B01F 7/00*    (2006.01)
  *B01F 15/02*   (2006.01)
  *B01F 5/06*    (2006.01)

(52) U.S. Cl.
  CPC ............ *B01F 5/106* (2013.01); *B01F 7/0075* (2013.01); *B01F 15/026* (2013.01); *B01F 15/0243* (2013.01); *B01F 15/0258* (2013.01); *B01F 2215/0014* (2013.01); *B01F 2215/0031* (2013.01); *B01F 2215/0032* (2013.01)

(58) Field of Classification Search
  USPC ..................................................... 366/182.2
  See application file for complete search history.

(56) References Cited

U.S. PATENT DOCUMENTS

| | | | |
|---|---|---|---|
| 6,589,301 B1 | 7/2003 | Magnin et al. | |
| 2002/0057625 A1* | 5/2002 | Russell | A61M 1/1656 366/136 |
| 2004/0217068 A1* | 11/2004 | Kirby | B01F 3/0446 210/760 |
| 2006/0233042 A1 | 10/2006 | Buchholz et al. | |
| 2009/0000989 A1* | 1/2009 | Hassan | B01F 3/04099 208/209 |
| 2010/0188927 A1* | 7/2010 | Sardina, Jr. | B01F 7/00916 366/162.1 |
| 2011/0013475 A1 | 1/2011 | Colding-Kristensen et al. | |
| 2013/0194888 A1 | 8/2013 | Hotta et al. | |

\* cited by examiner

LIQUID PROCESSING MIXER FOR MIXING A LIQUID WITH AN ADDITIVE

TECHNICAL FIELD

The present invention relates to a mixer for mixing liquid with liquid, gaseous, and/or solid additives. More particularly, the present invention relates to a mixer for processing hygienic substances, such as liquid food or cosmetics, as well as to a method for mixing such hygienic substances with various additives.

BACKGROUND

In liquid processing industry, such as food processing, mixers are widely used for providing an efficient mix of liquids with solid and/or gaseous contents. Within this technical field it is common to divide the available mixers into i) batch mixers or ii) inline mixers. Typically, a batch mixer operates by circulating the media to be mixed within a tank and it is often a preferred choice for high viscous fluids. Inline mixers are typically operating in a different manner, in which the fluids are circulated outside the tank for continuously mixing liquid. As compared with batch mixers, inline mixers are often preferred for low viscous liquids and for large volume production.

The pumping ability of existing in-line mixers and especially existing in-line high-shear mixers is significantly reduced when the liquid viscosity is increased. At viscosities above 1000 cP their pumping ability is often completely lost, in particular if their pump performance is based on the centrifugal principle. Today this limits the use of inline mixers to mixing applications for relatively low viscous fluids.

An example of a food processing mixer is described in WO2009/089837. The mixer includes a tank with a plurality of filling openings and a discharge opening at the bottom of the tank. A high shear rotor mixer is arranged at the bottom of the tank, and is fluidly connected to a valve being capable of diverting mixed liquid either out from the tank or back into the tank. Solid particles to be mixed are introduced in the tank at a level below the current filling level.

Although such mixer is very well functioning and provides numerous advantages, it has been suggested to provide an improved mixer reducing the complexity as well as reducing the risk of having non-dissolved powder lumps present in the liquid.

SUMMARY

It is, therefore, an object of the present invention to overcome or alleviate the above described problems.

The basic idea is to provide a mixer having a two-stage mixing unit and an associated de-aeration vessel, whereby solid and/or liquid additives are introduced downstream of the de-aeration vessel but upstream of the mixing unit.

A further idea is to provide a mixer of which a two-stage mixing unit is configured to control the vacuum inside the de-aeration vessel by means of a valve.

According to a first aspect, a liquid processing mixer is provided. The mixer comprises a mixing unit and a de-aeration vessel, said mixing unit being separated from said de-aeration vessel and in fluid connection with said de-aeration vessel, and wherein said liquid processing mixer further comprises at least one additive inlet arranged between said de-aeration vessel and a high shear mixing device of said mixing unit for introducing said additive downstream of said de-aeration vessel. Hence, bulk circulation is no longer required to draw down powders and liquid ingredients from the liquid surface since additives are not introduced in the de-aeration vessel. This means that the mixer speed (mixing intensity) may be adjusted arbitrary since too high speed will not result in inadequate mixing and ingredients lumping on the liquid surface due to a large vessel vortex, extensive in-mixing of air and thus foam generation.

The mixing unit may comprise a pumping device and a mixing device arranged in series. Preferably, these two devices may be arranged in a single unit such that efficient pumping and corresponding mixing is achieved by the same unit.

Said pumping device may be a self-priming pump, such as a twin screw pump, a side channel pump, or a liquid ring pump. Hence, very efficient pumping is provided, such that a sub-pressure may be provided in the de-aeration vessel. Further, the use of these pumps also ensures efficient pumping during such sub-pressure conditions. If an existing inline mixer should be connected to an upstream de-aeration vessel in order to create a vacuum zone at the inlet their pumping performance is significantly reduced. The pumping performance of existing in-line mixers that operates according to the centrifugal principle is lost when the suction pressure is reduced below −0.6 bar due to cavitation inside the mixer. This phenomenon limits the efficiency and use of an upstream de-aeration vessel and/or limits the use of an upstream vacuum zone to draw-in ingredients. Hence, all these drawbacks are overcome when the pumping device is selected from a twin screw pump, a side-channel pump, or a liquid ring pump.

Said mixing device may be a high shear mixer, such as a rotor stator mixer.

Said pumping device may be driven by a first motor, and said mixing device may be driven by a second motor. Alternatively, said pumping device and said mixing device may be driven by a common motor.

The liquid processing mixer may further comprise a bypass valve provided between said pumping device and said mixing device. Hence, specific products unsuitable for high shear mixing may be diverted from the mixing device, thus making the mixer more versatile for a large number of different liquids/additives. Further, the provision of a bypass valve provides an additional advantage over prior art mixers, since existing inline mixers cannot vary the shear imparted on the fluid for a constant rotational speed, and are not able to allow non-disruptive passing of large and/or shear sensitive particles.

The de-aeration vessel may be in fluid connection with a de-aeration valve for allowing air to escape from said de-aeration vessel. Hence, entrapped air may be easily ventilated from the mixer. Alternatively, the de-aeration vessel may be in fluid connection with a vacuum pump for evacuating said de-aeration vessel. This will allow the sub-pressure within the vessel to be easily controlled by the speed of the vacuum pump.

The liquid processing may further comprise a three-way valve for redirecting liquid flowing from said mixing unit back into the de-aeration vessel at any given ratio. Hence, it is possible to control the mixer such that the actual mixing rate will always correspond to a desired mixing rate.

According to a second aspect, a liquid processing system is provided. The system includes processing equipment for processing liquid to be mixed and a mixer according to the first aspect in fluid connection with said processing equipment.

Preferably, said liquid to be mixed is a hygienic liquid product, such as food, chemicals, pharmaceuticals, and/or cosmetics.

According to a third aspect, a method for providing a liquid processing mixer is provided. The method comprises the steps of providing a de-aeration vessel in fluid connection and upstream of a mixing unit, and arranging at least one additive inlet between said de-aeration vessel and a high shear mixer device of said mixing unit for introducing said additive upstream of said mixing unit.

According to a fourth aspect, a method for mixing a liquid product by means of a mixer according to the first aspect is provided. The method comprises the steps of filling said de-aeration vessel up to a predefined level while allowing excessive air to escape through a de-aeration valve; closing said de-aeration valve; pumping liquid out from said de-aeration vessel by means of said mixing unit; and introducing an additive into said liquid at a position arranged between the de-aeration vessel and a high shear mixer device of said mixing unit.

According to a fifth aspect, a liquid processing mixer is provided. The mixer comprises a mixing unit and a de-aeration vessel, said mixing unit being separated from said de-aeration vessel and in fluid connection with said de-aeration vessel, and wherein said mixing unit comprises a pumping device and a high shear mixer device arranged in series.

Preferably, said liquid processing mixer further comprises at least one additive inlet arranged between said de-aeration vessel and the high shear mixing device of said mixing unit for introducing said additive downstream of said de-aeration vessel.

Advantageous embodiments presented for the first aspect are also applicable for the fifth aspect.

BRIEF DESCRIPTION OF DRAWINGS

The above, as well as additional objects, features, and advantages of the present invention, will be better understood through the following illustrative and non-limiting detailed description of preferred embodiments of the present invention, with reference to the appended drawings, wherein.

DETAILED DESCRIPTION

Figure 1A:
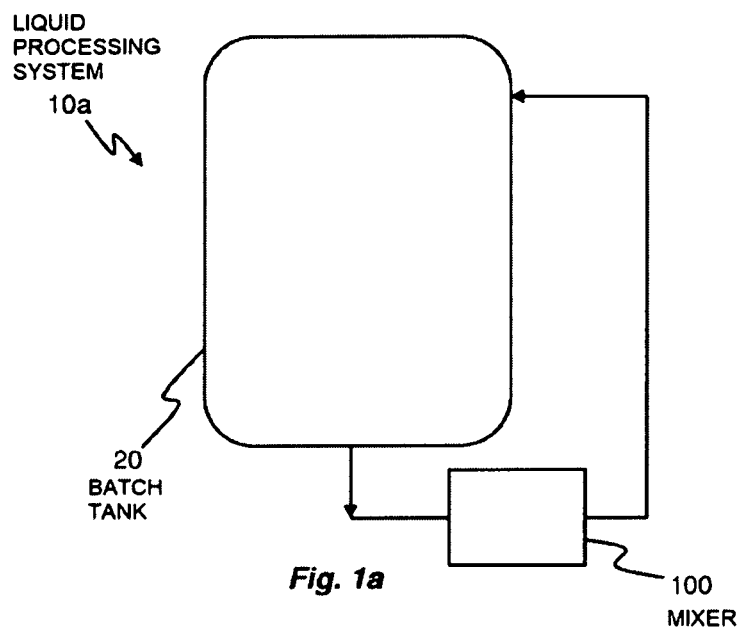
FIGS. 1a and 1b illustrate parts of a liquid processing system.

Starting with FIG. 1a, a part of a liquid processing system 10a is shown. The shown part may be included in a much larger processing system, including various liquid processing components such as heaters, homogenizers, separators, filters, etc in order to be able to completely, or partly, process a hygienic liquid product. An example of a liquid processing system 10a for use with the present invention is a liquid food processing system, capable of treating various liquid food products such as milk, juices, still drinks, ice creams, yoghurts, etc. However, a liquid processing system for use with the present invention may also include a system for treating and processing chemical, pharmaceutical, and/or cosmetic liquids.

The shown parts include a batch tank 20 and a mixer 100 in fluid connection with the batch tank. Hence, liquid to be mixed is circulated through the mixer 100 being arranged outside the batch tank 20 for providing and storing a large volume of mixed liquid.

Figure 1B:
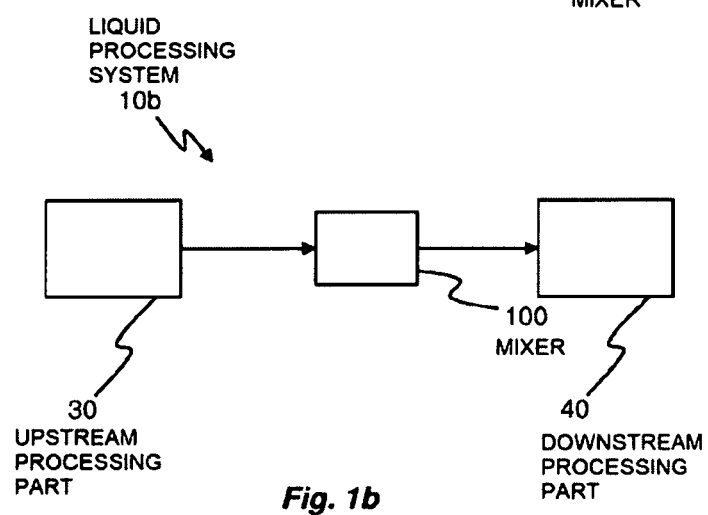

In FIG. 1b, another example of a part of a liquid processing system 10b is shown. Here, a mixer 100 is arranged in series with an upstream processing part 30, and a downstream processing part 40. The upstream processing part 30 may be a batchtank, thus similar to what is shown in FIG. 1a, or another tank or processing equipment. Correspondingly, the downstream processing part 40 may be another batchtank, or other processing equipment. It should be readily understood that "other processing equipment" may include a single processing component, such as a heater, a homogenizer, a separator, a cooler, etc., or be a general description of a group of such processing components.

Figure 2:
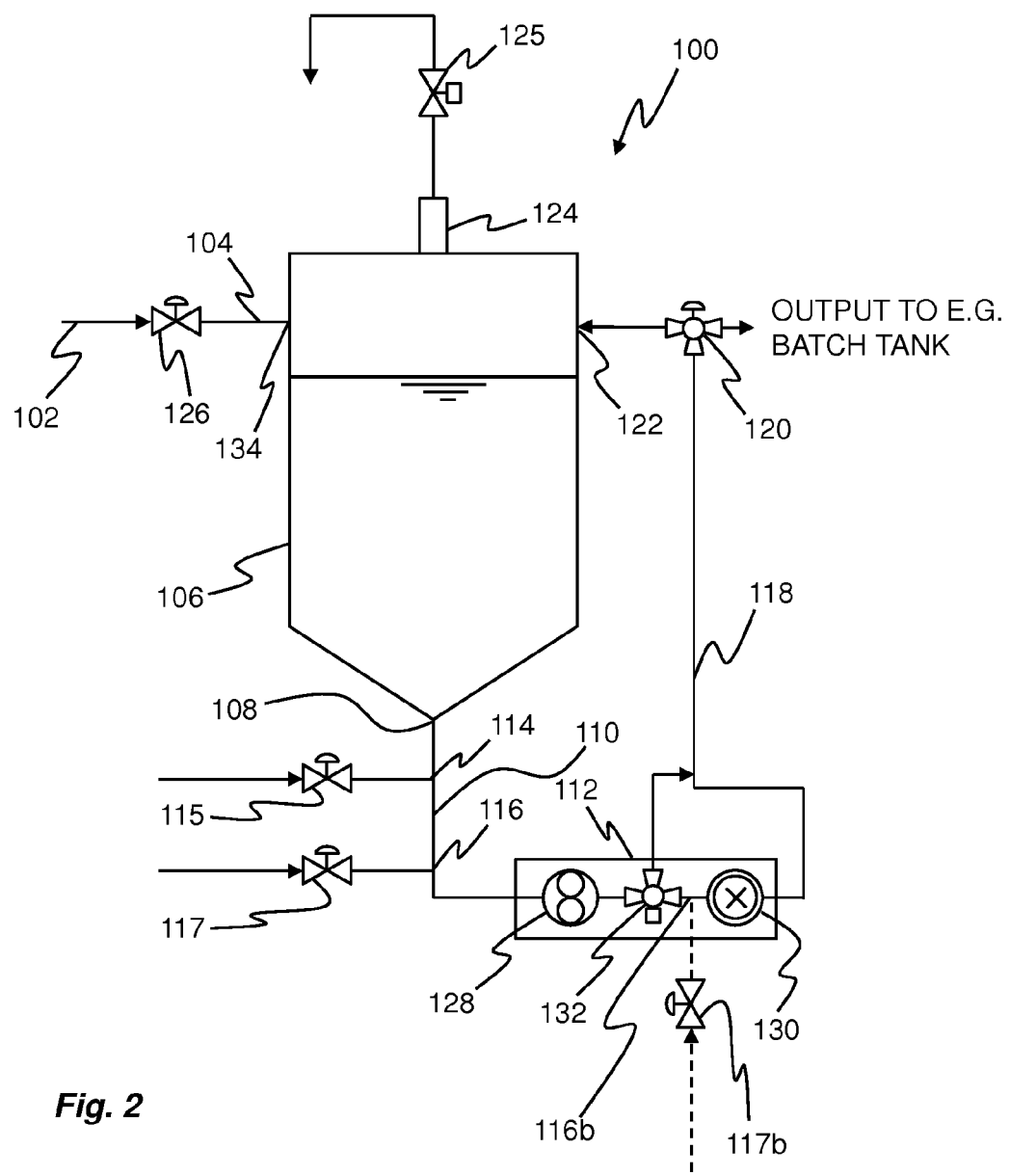
FIG. 2 illustrates a process scheme of a mixer according to an embodiment.

Now turning to FIG. 2, an embodiment of a mixer 100 is shown schematically. The mixer 100 thus represents a mixer being suitable for inclusion in any of the processing systems described above with reference to FIG. 1a or 1b. The mixer 100 has an inlet 102 to which liquid to be mixed is allowed to flow from the batch tank 20, or any upstream processing equipment. The liquid is guided through a pipe or similar conduit 104 into a de-aeration vessel 106, having a liquid outlet 108 arranged at the bottom end. Liquid exits the de-aeration vessel 106 through the outlet 108 and is further guided by means of a pipe or other suitable conduit 110 into a mixing unit 112. Between the outlet 108 and the mixing unit 112 further inlets 114, 116 are provided for allowing additives, such as powder or further liquids, to be introduced into the liquid flowing from the de-aeration vessel 106.

The mixing unit 112 provides a mechanical treatment of the liquid for further improving the mixing. An outlet end of the mixing unit is connected to a further pipe 118 which is connected to a three-way valve 120 at its opposite end. The three-way valve 120 is thus capable to direct the liquid flow through a first port connected to an inlet 122 of the de-aeration vessel 106, a second port connected to the batch tank (not shown) or any other downstream processing equipment, or both. The three-way valve 120 is thus capable of providing a varying ratio for de-aeration vessel recirculation vs. output to e.g. batchtank. In fact, the three-way valve 120 may be controlled continuously for any given ratio.

The upper part of the de-aeration vessel 106 has an air outlet 124 for allowing air to escape from the vessel 106, which outlet 124 is controlled by means of a de-aeration valve 125.

Before turning into specific details of the different components shown in FIG. 2, a general explanation of the working principle of the mixer 100 will be given.

When a liquid is to be mixed, e.g. in a situation where solid additives are to be finely dispersed or dissolved with a liquid product, the initial liquid is stored in the batch tank or flowing in an upstream processing equipment. The liquid is then fed into the de-aeration vessel 106, which is filled up to a predetermined maximum level. At this point, the vessel 106 is sealed off from the atmosphere and the mixing unit 112 is controlled to draw liquid out from the de-aeration vessel 106. Upon drawing liquid from the vessel 106, the liquid level within the vessel 106 will drop whereby the pressure inside the vessel 106 will drop correspondingly. When the desired vacuum level is reached the circulation flow over the batch tank, or output to downstream processing equipment, is established by means of the three-way valve 120, being configured to re-circulate a part of the outlet stream from the mixing unit 112 back into the vessel 106, and the remaining part to the batch tank or further downstream processing equipment.

During mixing, the liquid level may be reduced in order to maintain the vacuum in the vessel 106 by continuously controlling the position of the three-way valve 120. When the liquid level reaches a predefined low level limit, the position of the three-way valve 120 will change for providing 100% recirculation of the liquid into the vessel 106. Correspondingly, the vacuum is released by opening the ventilation valve 125. Further liquid is then introduced into the vessel 106 from the inlet 102 thus pushing out the air in the vessel 106 headspace. It should be noted that generated foam, e.g. larger bubbles will collapse when the vacuum is released. This "foam-kill" system ensures that no or very little product/foam is pushed out in this re-filling step.

Now returning to FIG. 2, the liquid supply is controlled by an inlet valve 126 arranged at the inlet 102 upstream the de-aeration vessel 106. The inlet valve 126 is preferably controlled such that the liquid level within the de-aeration vessel 106 is within predefined intervals.

In the present embodiment, two separate additive inlets 114, 116 are provided downstream of the de-aeration vessel 106. The first additive inlet 114, arranged upstream of the second additive inlet 116, is connected to a powder supply and is thus configured to introduce solid content, or particles, in the liquid discharged from the de-aeration vessel 106. The second additive inlet 116 is connected to a liquid supply and is thus configured to introduce additional liquid content, e.g. oil, in the liquid discharged from the de-aeration vessel 106. Introduction of additives is preferably controlled by means of at least one valve 115, 117 associated with the respective inlet 114, 116.

In a further embodiment, a gas inlet (not shown) may be provided for adding gaseous content to the liquid.

The additives, or ingredient entry points 114, 116 are thus preferably located between the outlet of the de-aeration vessel 106 and the mixer unit 112. The powder ingredients may be introduced a bit longer upstream than liquid ingredients since some spreading and pre-wetting of powders are beneficial for dispersing and dissolving while liquid ingredients are best introduced immediately before a high shear mixing stage. This may be of particular importance for hot-cold emulsification processes used for liquid food processing. All ingredients will thus pass through the mixer unit 112 before entering the de-aeration vessel 106 which eliminates the risk of having non-dissolved powder lumps, oil etc floating on the liquid surface. Should this be the case, a vortex and/or high vessel turbulence is usually required for necessary incorporation of the ingredients.

The blend of liquid and additives is then introduced in the mixing unit 112, which in this embodiment includes a pumping device 128 and a mixing device 130, which mixing device 130 is arranged downstream and in series with the pumping device 128.

The mixer unit 112 thus contains two stages, which in one embodiment may be a self-priming pumping device 128 based on the twin-screw principle, and a high-shear mixing device 130 based on the rotor-stator principle. Typically, a twin screw pump has a cylindrical body in which two parallel and eccentric screws are meshing with each other. When rotating the screws, liquid will be drawn thus providing a pumping action.

The pumping device 128 is preferably able to pump/circulate both low and high-viscous products, e.g. in the range of 1-100000 cP even under very poor suction conditions such as below 0.15 Bar. The proposed twin-screw device is advantageous in that it will only impart a very limited shear on the circulated fluid while at the same time also allowing non-disruptive passing of large particles. As an example, particles having a diameter of 20 mm may be flown through the pumping device 128; however the exact size depends on selected screw pitch of the twin screws.

The pumping device 128 is thus capable of providing a sub-pressure within the de-aeration vessel 106, as well as being capable of pumping liquid out from said de-aeration vessel also in the presence of such sub-pressure.

In other embodiments, the pumping device 128 may be a liquid ring pump or a side-channel pump. In general, the pumping device 128 should be a self priming pump.

The mixing device 130, i.e. the device used to provide high-shear mixing, is able to create high levels of shear and turbulence and thus to disperse, emulsify and/or dissolve incorporated liquid and powder ingredients. The proposed rotor-stator system is thus capable of creating none or very limited pumping effect and for some viscosities it might even cause a pressure drop.

Between said pumping device 128 and said mixing device 130, a three-way valve 132 may be provided for enabling by-passing of the high-shear mixing device 130 thereby allowing incorporation of shear sensitive ingredients and/or large particles. Preferably, the bypass valve 132 may be controlled continuously for any given ratio of mixed/unmixed liquid.

By using a high performance twin screw pump 128, vacuum inside the vessel 106 may be generated by using the superior suction performance of the pumping device 128 to pump out product from the initially filled-up and then sealed-off vessel 106.

The pumping device 128 and the mixing device 130 are driven by one common motor or alternatively by two separate motors. The total motor size will preferably be 22 kW—i.e. approximately 11 kW for each device 128, 130. In fact, proof-of-concept tests have verified that 11 kW is sufficient to circulate more than 65 m3/h at 3 Bar for low viscous products of 1 cP and more than 35 m3/h at 3 Bar for high viscous products of 2000 cP. These capacities allow extensive recirculation for improved product mixing and de-aeration.

The provision of the pumping mixing unit 112 allows additional ingredients supplied via the inlets 114, 116 to be easily introduced. As the mixing unit provides a sub-pressure in the pipe 110, opening of the valves 115, 117 will allow the additional ingredients to be drawn into the pipe 110 without the need for any external forces.

In a yet further embodiment, an additive inlet 116b is provided within the mixing unit 112 just upstream of the high-shear mixer device 130. This is indicated in FIG. 2, where a corresponding control valve 117b is provided to allow further ingredient addition via the inlet 116b. The additive inlet 116b may replace the previously described inlet 116, or it may be provided as an additional inlet. Preferably, the optional inlet 116b is used for including further liquids, such as oil, into the main liquid to be processed.

When exiting the mixing unit 112, the liquid is directed by the three-way valve 120 for either returning to the batch tank (or flowing to downstream processing equipment) or for returning to the de-aeration vessel 106. As previously been described, the three-way valve 120 may be controlled continuously to provide any given ratio between de-aeration vessel recirculation and output to batchtank or further processing equipment. The position of the three-way valve 120 may thus be controlled in order to obtain constant vacuum inside the de-aeration vessel 106.

The de-aeration vessel 106 may for this purpose be equipped with nozzles 134, 122 distributing the two inlet streams, i.e. the main inlet 134 coming from the batch tank and the re-circulation inlet 122 coming from the mixing unit 112 smoothly over the tank wall. This is primarily for generating a large product surface area that enhances de-aeration and secondly to avoid splashing and thus foam generation. Both inlets 134, 122 are located above liquid surface resulting in a first-in-first-out vessel 106. In some embodiment, the de-aeration vessel 106 may also be provided with an internal stirrer for improving the turbulence within the vessel 106.

Hence, the present mixer does not require bulk circulation since ingredients are introduced between the de-aeration vessel 106 and the mixer unit 112. Therefore all ingredients in the de-aeration vessel 106 have been through the mixer unit 112 at least once reducing the need for extensive bulk circulation for reducing the risk of powder lumps, oils etc floating on the liquid surface in the de-aeration vessel 106. Bulk circulation may e.g. be created only by the two tangential inlet streams coming from the main inlet and 134 and the recirculation inlet 122.

The present embodiment reduces the need for a separate vacuum pump. This fully removes the risk of foam overrun through the vacuum system caused by bubble and foam growth. Naturally such product loss is un-desirable and leads to hygienic and cleaning problems. In addition to this, a de-aeration vessel connected to a vacuum pump cannot be used if the product is toxic or for other reasons cannot escape the vessel/system.

In view of above, the speed of the pumping device 128 can thus be adjusted arbitrary and is not limited by vortex and foam constraints. The only air introduced in the present mixer 100 is the air embedded in the ingredients. The part of the embedded air that is evacuated by the vacuum will correspondingly be accumulated in the de-aeration vessel.

Figure 3:
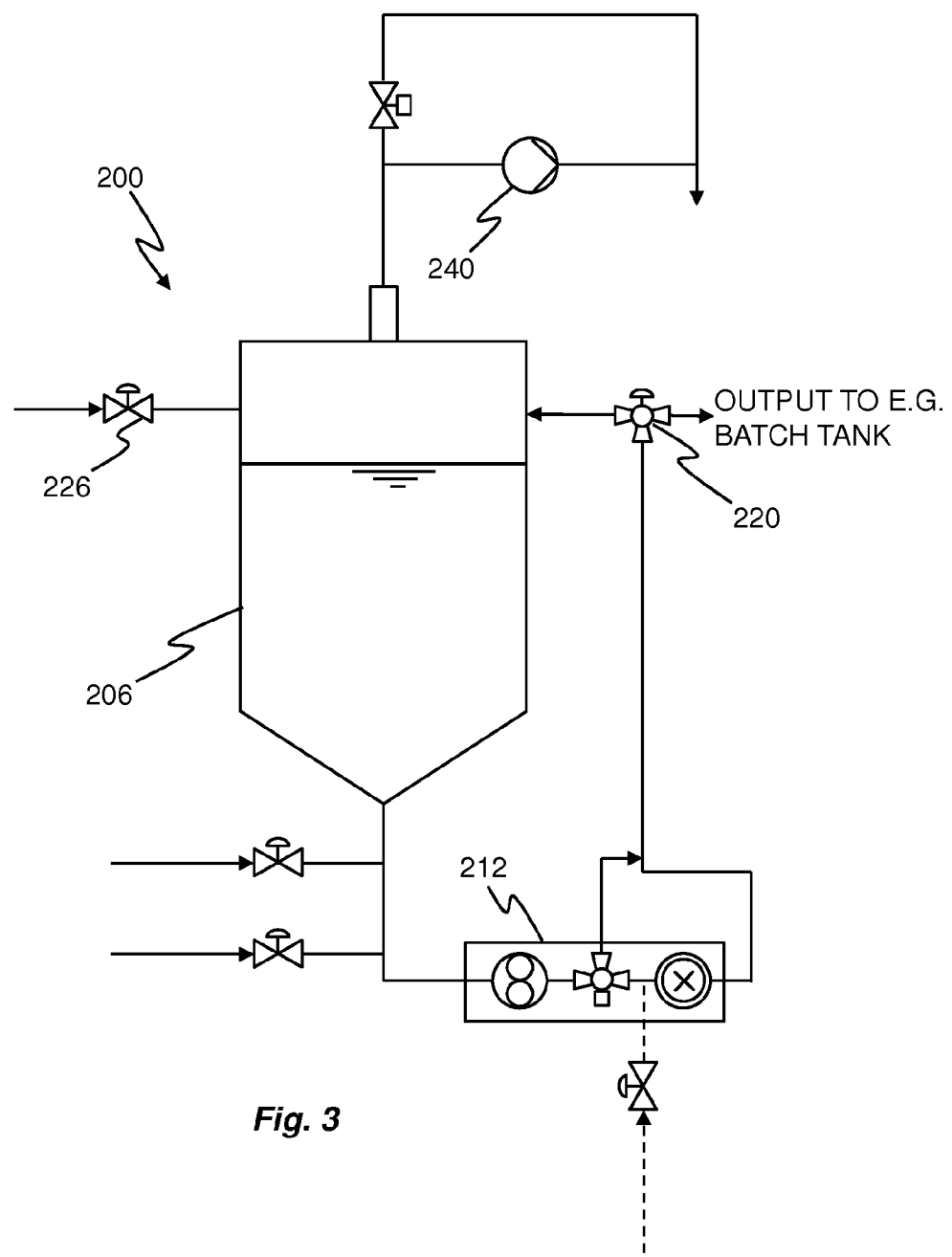
FIG. 3 illustrates a process scheme of a mixer according to a further embodiment.

Now turning to FIG. 3, another embodiment of a liquid processing mixer 200 is shown. The liquid processing mixer 200 comprises a de-aeration vessel 206 and a two-stage mixing unit 212 similarly to corresponding components discussed with reference to FIG. 1. Hence, additional components such as e.g. the inlet valve 226, and three-way valve 220 has a similar functionality as the components discussed with reference to FIG. 2. However, the mixer 200 differs from the previously described mixer 100 in that a separate vacuum pump 240 is connected to the de-aeration vessel 206 for pumping excessive air out from the de-aeration vessel 206. The size of the vacuum pump 240 may be relatively small, e.g. in the range of 2 kW for a liquid ring pump since the amount of air to be evacuated is limited to the amount of air embedded in the product ingredients. This is due to the fact that no air is incorporated due to vortex entrainment and surface whipping as described above. The vacuum level is preferably controlled by speed/frequency regulation of the vacuum pump 240 combined with a bleed valve (not shown) based on input from a pressure transmitter (not shown).

With reference to FIG. 2 and FIG. 3, a brief explanation of the operating principle will be given. Upon start-up, the valve 126 is open and the de-aeration valve 125 is also open. When the de-aeration vessel 106, 206 is filled up to pre-defined level, the inlet valve 126 is closed as well as the de-aeration valve 125. For providing a suitable vacuum level inside the vessel 106, 206, the three-way valve 120 is opened for drawing liquid from the vessel 106, 206 by means of the mixing unit 112, 212. In a subsequent balancing step, the inlet valve 126 opens and a careful control of the inlet valve 126 and the three-way valve 120 ensures a desired vacuum level. During this step, the de-aeration valve 125 is kept closed.

During production, or mixing, the additive inlet valves 115, 117, 117b are opened and the valves 126, 120 are regulated accordingly. The by-pass valve 132 of the two-stage mixing unit 112, 212 may be opened or closed depending on the particular liquid to be mixed.

The disclosed embodiments of a liquid processing mixer 100, 200 may preferably also be equipped with a cleaning-in-place (CIP) system, capable of cleaning the components without dismounting the mixer 100, 200.

Although the above description has been made mostly with reference to a liquid food processing system, it should be readily understood that the general principle of the mixer is applicable for various different liquid processing systems.

Further, the invention has mainly been described with reference to a few embodiments. However, as is readily understood by a person skilled in the art, other embodiments than the ones disclosed above are equally possible within the scope of the invention, as defined by the appended claims.

The invention claimed is:

1. A liquid processing mixer, comprising:
   a mixing unit comprising a pumping device and a high shear mixing device arranged in series;
   a de-aeration vessel, said mixing unit being separated from said de-aeration vessel and in fluid connection with said de-aeration vessel;
   at least one additive inlet arranged between said de-aeration vessel and said high shear mixing device of said mixing unit for introducing an additive downstream of said de-aeration vessel, said at least one additive inlet being upstream of said pumping device;
   said de-aeration vessel being in fluid connection with a vacuum pump for evacuating said de-aeration vessel;
   a downstream additive inlet within the mixing unit, said downstream additive inlet being upstream of said high shear mixing device and downstream of said pumping device; and
   a bypass valve provided between said pumping device and said high shear mixing device.

2. The liquid processing mixer according to claim 1, wherein said pumping device is a self-priming pump.

3. The liquid processing mixer according to claim 1, wherein said pumping device is a twin screw pump, a side channel pump, or a liquid ring pump.

4. The liquid processing mixer according to claim 1, wherein said pumping device is capable of providing a sub-pressure within said de-aeration vessel.

5. The liquid processing mixer according to claim 1, wherein said mixing device is a rotor stator mixer.

6. The liquid processing mixer according to claim 1, wherein said pumping device is driven by a first motor, and said mixing device is driven by a second motor.

7. The liquid processing mixer according to claim 1, wherein said pumping device and said mixing device are driven by a common motor.

8. The liquid processing mixer according to claim 1, wherein said de-aeration vessel is in fluid connection with a de-aeration valve for allowing air to escape from said de-aeration vessel.

9. The liquid processing mixer according to claim 1, further comprising a three-way valve for redirecting liquid flowing from said mixing unit back into the de-aeration vessel at any given ratio.

10. A liquid processing system, including processing equipment for processing liquid to be mixed and a mixer according to claim 1, in fluid connection with said processing equipment.

11. The liquid processing system according to claim 10, wherein said liquid to be mixed is a hygienic liquid product.

12. The liquid processing mixer according to claim 1, wherein said at least one additive inlet consists of a first additive inlet and a second additive inlet, said first and second additive inlets being downstream of said outlet of said de-aeration vessel and upstream of said high shear mixing device and said pump of said mixing unit.

13. The liquid processing mixer according to claim 1, wherein the pump is a twin screw pump configured to pass particles having a diameter of 20 mm therethrough.

14. A method for providing a liquid processing mixer, comprising:
   providing a de-aeration vessel in fluid connection and upstream of a mixing unit, the mixing unit including a pumping device and a high shear mixing device arranged in series;
   arranging at least one additive inlet between said de-aeration vessel and said high shear mixer device and said pump of said mixing unit, the at least one additive inlet for introducing an additive into the fluid flowing from the outlet of the de-aeration device at a position upstream of said mixing unit;
   arranging a downstream additive inlet upstream of said high shear mixing device and downstream of said pumping device;
   arranging a vacuum pump in fluid connection with said de-aeration vessel for evacuating said de-aeration vessel; and
   arranging a bypass valve between said pumping device and said high shear mixing device.

15. A method for mixing a liquid product by means of a mixer according to claim 1, comprising:
   filling said de-aeration vessel up to a predefined level while allowing excessive air to escape through a de-aeration valve;
   closing said de-aeration valve;
   pumping liquid out from said de-aeration vessel by way of said mixing unit; and
   introducing said additive into said liquid at a position arranged between the de-aeration vessel and a high shear mixer device of said mixing unit.

* * * * *